(12) United States Patent
Speidel

(10) Patent No.: US 11,942,670 B2
(45) Date of Patent: Mar. 26, 2024

(54) ASSEMBLY FOR AN ELECTROCHEMICAL SYSTEM, STACK, AND ELECTROCHEMICAL SYSTEM

(71) Applicant: Reinz-Dichtungs-GmbH, Neu-Ulm (DE)

(72) Inventor: André Speidel, Neu-Ulm (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 77 days.

(21) Appl. No.: 17/448,017

(22) Filed: Sep. 17, 2021

(65) Prior Publication Data

US 2022/0093952 A1  Mar. 24, 2022

(30) Foreign Application Priority Data

Sep. 18, 2020  (DE) ................ 202020105365.5

(51) Int. Cl.
*H01M 8/1004* (2016.01)
*C25B 9/19* (2021.01)
*C25B 9/63* (2021.01)
*H01M 8/0228* (2016.01)
*H01M 8/0273* (2016.01)
*H01M 8/0297* (2016.01)

(52) U.S. Cl.
CPC ............ *H01M 8/1004* (2013.01); *C25B 9/19* (2021.01); *C25B 9/63* (2021.01); *H01M 8/0228* (2013.01); *H01M 8/0273* (2013.01); *H01M 8/0297* (2013.01)

(58) Field of Classification Search
CPC .................................................. H01M 8/1004
See application file for complete search history.

(56) References Cited

U.S. PATENT DOCUMENTS

| 4,590,135 A | * | 5/1986 | Warszawski | ........ H01M 8/0273 429/514 |
| 2009/0029217 A1 | * | 1/2009 | Kawabata | ........... H01M 8/1004 429/433 |
| 2012/0270131 A1 | * | 10/2012 | Fukuta | ................ H01M 8/2457 429/454 |

FOREIGN PATENT DOCUMENTS

| DE | 202012004926 U1 | 8/2013 |
| JP | 2008071506 A | * 3/2008 |

OTHER PUBLICATIONS

JP2008071506A—machine translation (Year: 2008).*

* cited by examiner

Primary Examiner — Haroon S. Sheikh
(74) Attorney, Agent, or Firm — McCoy Russell LLP

(57) ABSTRACT

An assembly for an electrochemical system, comprising a separator plate with at least one layer and a membrane electrode assembly, MEA, the MEA having: an electrochemically active region, a frame-like reinforcing layer surrounding the electrochemically active region, and at least one tab for positioning the MEA relative to the separator plate and/or for fastening the MEA to the separator plate, wherein the layer has a first flat side and a second flat side opposite the first flat side, wherein the tab is connected at one side to the frame-like reinforcing layer and its free end is arranged on the side of the second flat side of the layer, wherein the frame-like reinforcing layer is arranged on the first flat side of the layer.

17 Claims, 11 Drawing Sheets

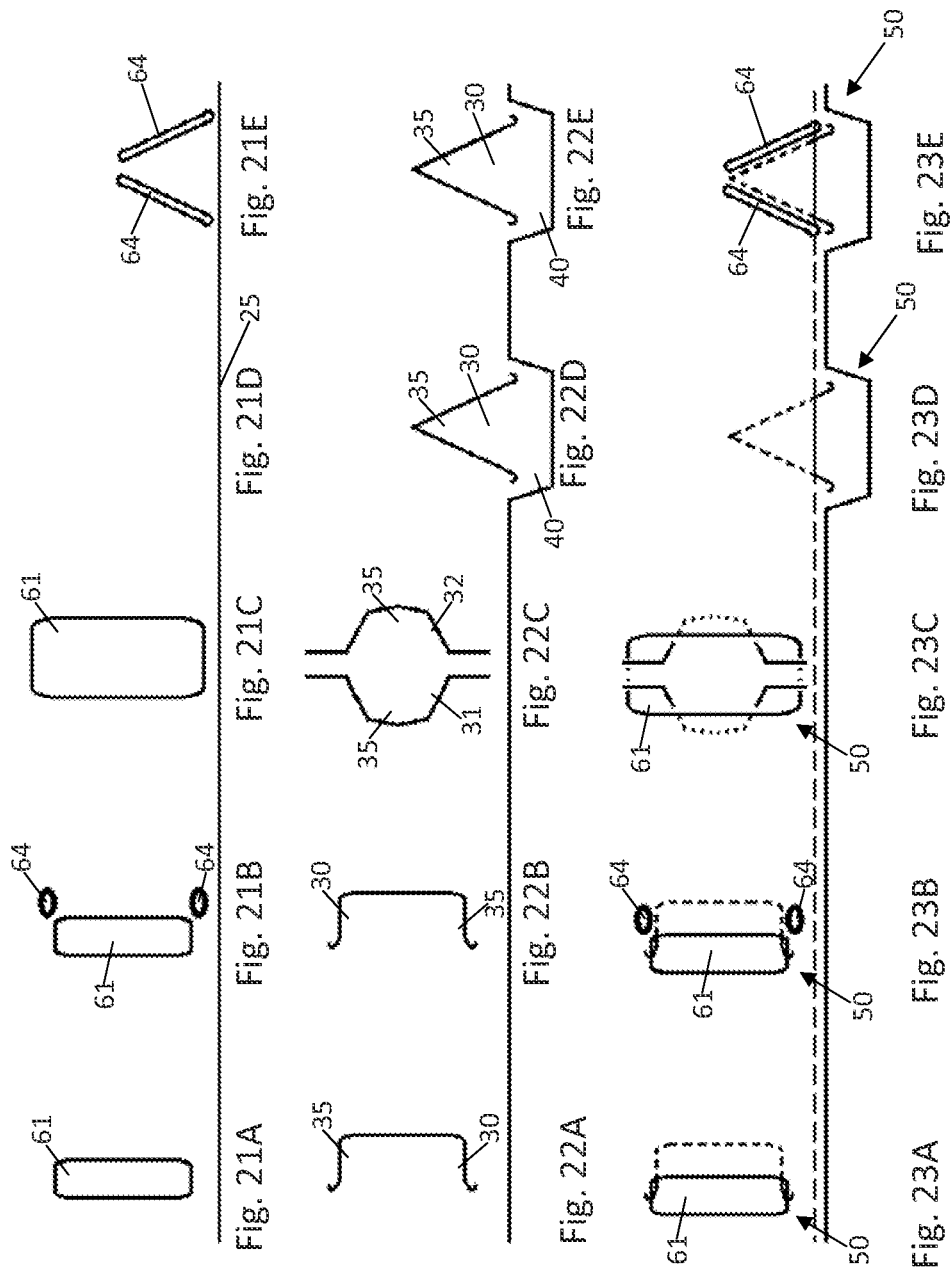

ASSEMBLY FOR AN ELECTROCHEMICAL SYSTEM, STACK, AND ELECTROCHEMICAL SYSTEM

CROSS-REFERENCE TO RELATED APPLICATION

The present application claims priority to German Patent Application No. 20 2020 105 365.5, entitled "ASSEMBLY FOR AN ELECTROCHEMICAL SYSTEM, STACK, AND ELECTROCHEMICAL SYSTEM", and filed on Sep. 18, 2020. The entire contents of the above-listed application is hereby incorporated by reference for all purposes.

TECHNICAL FIELD

The present disclosure relates to an assembly for an electrochemical system, which comprises a separator plate and a membrane electrode assembly (MEA). The present disclosure additionally relates to a stack comprising a plurality of such assemblies, and to an electrochemical system comprising at least one such assembly. The electrochemical system may be a fuel cell system, an electrochemical compressor, an electrolyzer, or a redox flow battery. The assembly or stack can also be used in a humidifier for an electrochemical system, with the electrochemically active region in this case being replaced by a water transfer region.

BACKGROUND AND SUMMARY

Known electrochemical systems usually comprise a stack of electrochemical cells, which are each separated from one another by separator plates. Such separator plates may serve for example for indirectly electrically contacting the electrodes of the individual electrochemical cells (for example fuel cells) and/or for electrically connecting adjacent cells (series connection of the cells). The separator plates are typically formed of two layers which are joined together. In this case, the separator plates are often referred to as bipolar plates. The layers (individual plates) of the separator plates may be joined together in a materially bonded manner, for example by one or more welded joints, such as by one or more laser-welded joints.

The separator plates or the layers may each have or form structures which are configured for example to supply one or more media to the electrochemical cells bounded by adjacent separator plates and/or to remove reaction products therefrom. The media may be fuels (for example hydrogen or methanol) or reaction gases (for example air or oxygen). Furthermore, the separator plates or the individual plates may serve structures for guiding a cooling medium through the separator plate, such as through a cavity enclosed by the layers of the separator plate. Furthermore, the separator plates may be configured to transmit the waste heat that arises when converting electrical and/or chemical energy in the electrochemical cell, and also to seal the various media channels and cooling channels with respect to one another and/or with respect to the outside.

Similar structures are also present on separator plates of humidifiers for electrochemical systems. What is stated below can thus also apply accordingly to separator plates of humidifiers.

Furthermore, the separator plates usually each have a plurality of through-openings. Through the through-openings, the media and/or the reaction products can be conducted to the electrochemical cells bounded by adjacent separator plates of the stack or into the cavity formed by the individual plates of the separator plate, or can be conducted out of the cells or out of the cavity.

The electrochemical cells also each comprise one or more membrane electrode assemblies (MEAs). The MEAs may have one or more gas diffusion layers, which are usually oriented towards the separator plates and are configured for example as a metal or carbon fleece. In addition, the MEAs each have a frame-like reinforcing layer which surrounds the electrochemically active region of the MEA and is typically made of an electrically insulating material.

The stack is usually produced by repeatedly joining together separator plates and MEAs in an alternating sequence. A sequential joining-together of separator plates and MEAs therefore takes place, with the separator plates and the MEAs being supplied individually.

When producing the stack, care should be taken for example to ensure that openings are positioned in alignment with one another and that the layers do not slip relative to one another as the individual layers are being tightly pressed together, since this can lead to leaks and to the system as a whole becoming inoperative.

This is made more difficult by the fact that MEAs are usually fragile and flexible, and therefore they are often difficult to handle when producing the stack. Difficulties arise, for example, in precisely positioning the MEA on a separator plate previously mounted on the stack. Due to the difficulty in precisely positioning an MEA on the adjoining separator plate, the assembling of a conventional stack comprising a plurality of electrochemical cells can be automated only with difficulty, which is a disadvantage with regard to mass production.

To make it easier to produce the stack, it would be advantageous to combine the separator plate and the MEA with one another following manufacture of the separator plate, so as to form an assembly, and to stack the respective assemblies one on top of the other when producing the stack.

Such pre-assembling of the separator plate with the MEA is disclosed for example in DE 10 2005 046 461 A1. In said document, the separator plate and the MEA are adhesively bonded to one another in a preparatory step to form a composite structure. A plurality of composite structures are then joined to form the stack. However, if the position of the two joining partners relative to one another is incorrect, it may be difficult to correct this position on account of the adhesive force of the adhesive used. In addition, for a stack of N cells, N additional adhesive-bonding, drying or curing steps are required, N typically being greater than 250. The additional manufacturing time and the additional effort are also disadvantageous with regard to mass production.

DE 20 2012 004 926 U1 likewise deals with the problem of positioning the separator plate and the MEA relative to one another. For this purpose, elements are provided which enable a self-centering of the MEA perpendicular to the stacking direction. Although DE 20 2012 004 926 U1 therefore requires no adhesive and no additional process steps, the problem of handling the individual MEAs still exists.

Proceeding from this problem, the object of the present disclosure is to make it easier to position MEAs and separator plates relative to one another.

This object is achieved by an assembly, a stack and a system as described herein.

Accordingly, an assembly for an electrochemical system is proposed. The assembly comprises a separator plate with at least one layer and a membrane electrode assembly (MEA), the MEA having:

an electrochemically active region, a frame-like reinforcing layer surrounding the electrochemically active region, and at least one tab for positioning the MEA relative to the separator plate and/or for fastening the MEA to the separator plate.

The layer has a first flat side and a second flat side opposite the first flat side, wherein the tab is connected at one side to the frame-like reinforcing layer and its free end is arranged on the side of the second flat side of the layer, wherein the frame-like reinforcing layer is arranged on the first flat side of the layer.

The MEA may be connected to the separator plate by means of the tab in a form-fitting and/or force-fitting manner, the form fit usually accounting for the majority of the connection. In some embodiments, there is therefore no need for a materially bonded connection, such as an adhesive bond. Therefore, the MEA and the separator plate are not connected to one another in a materially bonded manner. It is thus possible to fasten and/or position the MEA relative to the separator plate without using an additional adhesive and without carrying out additional work steps, such as drying processes for example.

Thus, by means of the at least one tab, it can be ensured that the MEA and the separator plate are fixed relative to one another and/or connected to one another. As a result, a composite structure consisting of MEA and separator plate can be created by the assembly, which has sufficient intrinsic stability not to slip or fall apart during transport or handling of the composite structure. The proposed assembly can therefore facilitate transport and/or handling in automated systems. Specifically, one crucial advantage when producing stacks by joining together assemblies of the described type is to be seen in the fact that, with this joining-together, it is no longer necessary to handle individual MEAs because these are already fastened to the separator plate. Therefore, when assembling the stack, the assemblies then serve as pre-constructed modules, the joining-together of which no longer causes any difficulties and can even be largely automated.

In contrast, such possibly automated or partially automated assembling is not always possible in the case of conventional stacks since, when producing these, the MEAs, which are of unstable shape and are difficult to handle, are placed individually on the growing stack.

Another advantage achieved by pre-constructing the assemblies of the described type as modules for subsequently assembling a stack is the possibility of testing individual assemblies beforehand and checking them for damage, for example. Damage can thus be detected at an early stage.

Here, the chosen wording "the free end of the tab is arranged on the side of the second flat side of the layer" means that the free end is arranged on the side of the second flat side and thus may be arranged directly or indirectly on the second flat side of the layer. In other words, the free end may be arranged directly on the second flat side of the layer, without any interposed element, or else at least one element, such as a further layer, may be arranged between the free end and the second flat side of the layer.

Depending on the embodiment, the separator plate has, at least in part, a single layer or exactly two layers. The outer region may have a single layer or exactly two layers. Optionally, one or more further layers may also be present in the portion adjacent to the electrochemically active region of the MEA. If two layers are provided, the exactly two layers may each have a first and a second flat side, the second flat side of the first layer adjoining the first flat side of the second layer. In this case, the free end of the tab may be arranged on the side of the second flat side of the first layer, the frame-like reinforcing layer being arranged on the first flat side of the first layer. The free end of the tab may be arranged on the second flat side of the first layer, the frame-like reinforcing layer being arranged on the first flat side of the first layer. Alternatively, the free end of the tab may be arranged on the second flat side of the second layer, the frame-like reinforcing layer being arranged on the first flat side of the first layer. The two layers are usually each designed as individual plates and are connected to one another in a materially bonded manner, for example by welded joints or soldered joints.

Optionally, the tab is formed integrally with the frame-like reinforcing layer. By way of example, at least one incision or recess is provided in the frame-like reinforcing layer, which incision or recess delimits a border of the tab. The tab may in this case define a cutout in the frame-like reinforcing layer. In addition, at least one incision or at least one recess may be provided which extends at an angle, often substantially perpendicularly, to a main direction of extension of the tab or to an insertion or push-in direction of the tab. This incision or recess may enable the tab to move and/or may prevent tearing of the tab. The tab may be semi-circular, rectangular, trapezoidal, crescent-shaped, tongue-shaped, U-shaped or V-shaped.

Even if the tab is formed integrally with the frame-like reinforcing layer, the bearing of the frame-like reinforcing layer against a surface does not mean that the tab also bears against the same surface. Instead, what is meant is that the frame-like reinforcing layer, minus the portion that forms the tab, bears against this surface; the tab itself may bear against a different surface.

The frame-like reinforcing layer may be of single-layer or multi-layer construction and in this case may have multiple film layers. If the frame-like reinforcing layer has multiple layers, for example two layers, the tab may be formed by at least one of the film layers or both film layers. It is also possible that the ionomer of the actual membrane, for instance without a catalyst coating, extends through the region of the frame-like reinforcing layer. This, too, can be regarded as a film layer in this connection. By way of example, the tab may define a cutout in one of the film layers of the frame-like reinforcing layer, the cutout being covered by a further film layer of the frame-like reinforcing layer. The further film layer may in this case intrinsically have an electrically insulating function. The advantage of this design is that the likelihood of short-circuits within an electrochemical cell can thus be reduced. One of the at least one further film layers may extend only in the region of the cutout, which is defined by the tab, and the edges thereof. As an alternative or in addition, one of the at least one further film layers may also be substantially congruent with the first film layer. In this case, at least two film layers may have substantially the same frame-like basic shape, which surrounds the electrochemically active region, but they may also overlap one another only in part.

In some embodiments, the tab and the frame-like reinforcing layer may be separate elements which are connected to one another. In some embodiments of the tab therefore need not be part of the frame-like reinforcing layer. The tab and the frame-like reinforcing layer may be connected to one another in a materially bonded manner. For instance, the tab may be adhesively bonded or welded to the frame-like reinforcing layer. In this case, too, the frame-like reinforcing layer may have one or more layers, for example two layers.

Adjacent to the tab, the frame-like reinforcing layer may protrude beyond an inner or outer edge of the separator plate. Here, the outer edge means the outer contour, while the inner edge may be for example a rim of a through-opening formed in the separator plate, such as a through-opening for fluid. For example, the frame-like reinforcing layer has a protrusion which protrudes laterally beyond the inner or outer edge of the separator plate, the side of the tab connected to the frame-like reinforcing layer being arranged in the region of the protrusion. The end of the tab connected to the frame-like reinforcing layer may also protrude at least partially beyond the inner or outer edge of the separator plate. In this embodiment, the separator plate need not be adapted to the MEA with the tab described in this document. This has the advantage that known or already manufactured separator plates can be used and can be equipped with the MEA.

In addition or as an alternative, an inner or outer edge of the separator plate may have a recess, the tab being arranged in the region of the recess. The frame-like reinforcing layer may protrude beyond the set-back inner or outer edge of the separator plate in the region of the recess.

The at least one layer of the separator plate may have a through-opening, through which the tab engages. In this case, the through-opening may be a through-opening which is already provided, such as the above-described through-opening for fluid. In this embodiment, the tab may be connected to the through-opening of a known or already manufactured separator plate or layer.

However, the at least one layer or separator plate may also have a through-opening designed specifically for the tab. For instance, the through-opening may be designed in such a way that it bounds laterally, with a substantially precise fit, the tab engaging therethrough. The through-opening may be located in a region of the separator plate that has no fluid-guiding function, such as outside of a fluid-guiding region of the separator plate and/or outside of a region defined by a peripheral seal such as a perimeter bead arrangement. By way of example, the through-opening is provided in an outer edge region of the separator plate. If the separator plate has two layers, both layers may have through-openings which are aligned with one another. Alternatively, it is also possible for just one of the layers to have said through-opening.

Furthermore, the frame-like reinforcing layer may comprise at least two tabs. The at least two tabs may be arranged at different locations on the frame-like reinforcing layer. According to one embodiment, at least two tabs are inserted in different through-openings. The frame-like reinforcing layer may also have two tabs, the tabs engaging through the same through-opening of the layer. In this case, the free ends of the tabs may point away from one another. In some embodiments, the tabs are arranged on opposite sides of the electrochemically active region. The tabs may be designed in such a way that the MEA is under tensile stress in the region between the tabs.

The described separator plate can be referred to as the first separator plate. The assembly may also comprise a second separator plate, the first separator plate and the second separator plate being arranged on opposite sides of the MEA. In this case, the MEA arranged between the separator plates may have at least one second tab, which can be connected to the second separator plate in the manner described above.

The separator plate usually has at least one peripheral, intrinsically closed sealing element, which encloses a region of the separator plate and seals off this region with respect to the surrounding environment and/or within an electrochemical cell. The separator plate often has a flow field for a medium and/or at least one through-opening for the passage of a medium, the at least one sealing element extending around the flow field and/or the through-opening. The at least one sealing element may be embossed into the separator plate and may be designed for example as a sealing bead.

The layer may have at least one embossed structure in the region of the tab, the tab typically bearing against the embossed structure. The embossed structure may in this case adjoin the through-opening and/or the recess in the separator plate. In this embodiment, adjoining need not necessarily be understood as directly adjoining; for manufacturing reasons, a small gap may also exist between the two elements, said gap being for example six times or ten times the thickness of the layer (for example, sheet-metal thickness). If two layers are provided, the first layer may have the through-opening, while the second layer has the embossed structure. It may also be provided that both layers each have an embossed structure and/or the through-opening.

The embossed structure may be designed to stiffen the region of the layer around the tab. In addition or as an alternative, the embossed structure may be designed to form a receptacle for the tab and/or to bound the tab laterally. In some embodiments, the embossed structure may serve as a spacer for the tab and/or an intermediate region defined between two layers of the separator plate. The frame-like reinforcing layer may in part bear against the embossed structure. The embossed structure may for example have a height, measured perpendicular to the plate plane of the layer, which is at least as large as the thickness of the tab, measured perpendicular to the plate plane of the layer.

The embossed structure may be arranged outside of the region of the separator plate enclosed by said sealing element. The embossed structure is usually arranged at a distance from the peripheral sealing element. Since the embossed structure is usually provided only for fastening the tab, usually no sealing function or flow-guiding function is associated with this type of embossed structure. The embossed structure is typically provided in an outer edge region of the layer or separator plate.

The tab and the frame-like reinforcing layer are usually formed of an electrically insulating material. The at least one layer may be formed of a metal material or a metal alloy. This may be steel, stainless steel, titanium, or combinations of nickel, chromium or other transition metals. The frame-like reinforcing layer and the outer edge region of the layer or separator plate may overlap and make contact at least in part.

The MEA typically comprises a membrane, for example an electrolyte membrane, which usually forms the electrochemically active region. The membrane may be connected to the frame-like reinforcing layer. By way of example, the frame-like reinforcing layer may be connected to the membrane in a materially bonded manner, for example by way of an adhesive bond or by lamination. If two frame-like reinforcing layers are provided, an outer edge of the membrane is typically arranged between the two reinforcing layers.

Furthermore, a gas diffusion layer (GDL) may be arranged on one or both surfaces of the MEA. The gas diffusion layer is arranged at least in the electrochemically active region of the MEA, wherein it typically protrudes beyond an edge of the electrochemically active region and in part adjoins the frame-like reinforcing layer, bears against it, or is connected thereto at least in part.

The described assembly can be produced for example by the following method.

First, an MEA and a separator plate are individually manufactured according to what has been stated above and are made available. The free end of the tab is then connected to the separator plate, such as in a form-fitting and/or force-fitting manner, in order to form the assembly. Prior to joining, the MEA can be moved towards the separator plate or placed on the separator plate. Alternatively, the separator plate is moved towards the MEA or placed on the MEA. The tab can be arranged on the side of the second flat side by pushing, bending, folding or insertion. In one embodiment, a ram is used to push, bend or insert the tab through said through-opening or into said receptacle. Alternatively, the tab can be placed, pushed or bent around the outer edge or inner edge of the separator plate.

Also proposed by the present disclosure is a stack which comprises a plurality of assemblies of the type described above. When producing said stack, it is advantageous if, as described above, pre-assembled units consisting of MEAs and separator plates are stacked one on top of the other.

The present disclosure also provides an electrochemical system which comprises at least one assembly and/or stack of the type described above. The electrochemical system may be a fuel cell system, an electrochemical compressor, an electrolyzer, or a redox flow battery. The assembly or stack can also be used in a humidifier for an electrochemical system, the electrochemically active region in this case being replaced by a water transfer region. Furthermore, in the case of a humidifier, it is advantageous if the separator plate consists only of one individual plate.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 21A-21E each schematically show a top view of a portion of an outer edge of a separator plate.

FIGS. 22A-22E each schematically show a top view of a portion of a frame-like reinforcing layer of an MEA.

FIGS. 23A-23E show an assembly comprising a separator plate of FIGS. 21A-21E and an associated MEA of FIGS. 22A-22E. In the following description and in the figures, recurring and functionally identical features are provided with the same reference signs. For reasons of clarity, reference signs are sometimes not specified in every example, even though the associated elements may be present in the example in question.

FIGS. 1-23E are shown approximately to scale.

DETAILED DESCRIPTION

Figure 1:
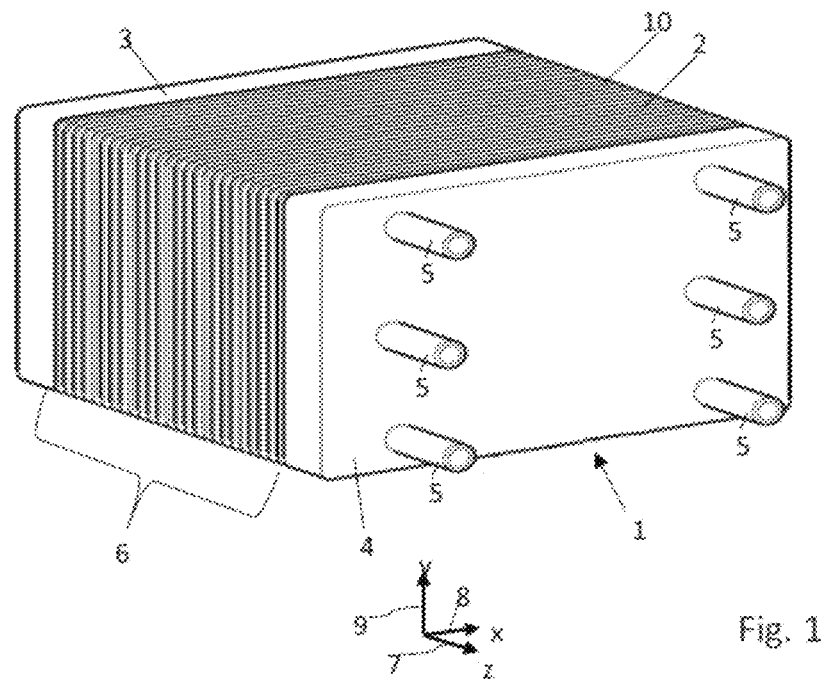
FIG. 1 schematically shows, in a perspective view, an electrochemical system comprising a plurality of separator plates or bipolar plates arranged in a stack.

FIG. 1 shows an electrochemical system 1 of the type proposed here, comprising a plurality of structurally identical metal separator plates or bipolar plates 2, which are arranged in a stack and are stacked along a z-direction 7. To form the electrochemical cells of the system 1, a membrane electrode assembly (MEA) is arranged in each case between adjacent separator plates 2 of the stack 6 (see for example FIG. 2). Each MEA typically contains at least one membrane, for example an electrolyte membrane. Furthermore, a gas diffusion layer (GDL) may be arranged on one or both surfaces of the MEA. The separator plates 2 and the MEAs 10 of the stack 6 are clamped between two end plates 3, 4. The z-direction 7 will also be referred to as the stacking direction. In the present example, the system 1 is a fuel cell stack 6. Each two adjacent separator plates 2 of the stack 6 therefore enclose between them an electrochemical cell, which serves for example to convert chemical energy into electrical energy.

In alternative embodiments, the system 1 may also be configured as an electrolyzer, as a compressor, or as a redox flow battery. Separator plates can likewise be used in these electrochemical systems. The structure of these separator plates may then correspond to the structure of the separator plates 2 explained in detail here, although the media guided on and/or through the separator plates in the case of an electrolyzer, an electrochemical compressor or a redox flow battery may differ in each case from the media used for a fuel cell system. The same applies to the structure of a humidifier for an electrochemical system.

The z-axis 7, together with an x-axis 8 and a y-axis 9, spans a right-handed Cartesian coordinate system. The separator plates 2 in each case define a plate plane, wherein the plate planes of the separator plates are each aligned parallel to the x-y plane, and thus perpendicular to the stacking direction or to the z-axis 7. The end plate 4 includes a plurality of media connections 5, via which media are suppliable to the system 1 and via which media are dischargeable out of the system 1. Said media that can be fed to the system 1 and discharged from the system 1 may comprise for example fuels such as molecular hydrogen or methanol, reaction gases such as air or oxygen, reaction products such as water vapor or depleted fuels, or coolants such as water and/or glycol.

FIG. 1 can represent both parts of a conventional electrochemical system 1 and an electrochemical system 1 according to the present disclosure.

Figure 2:
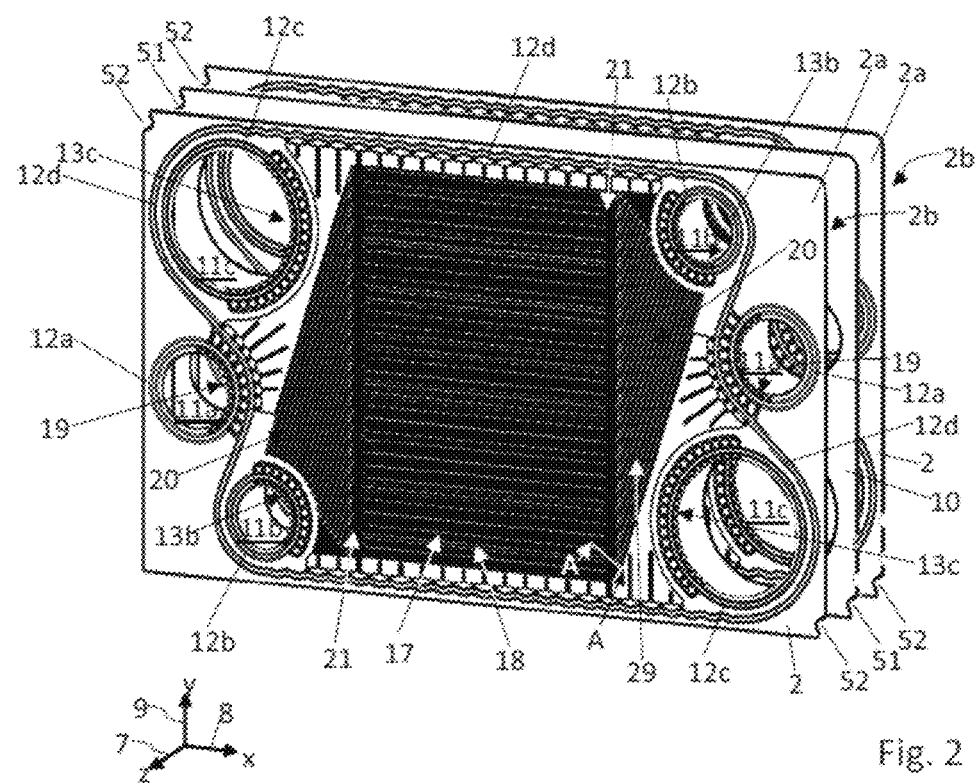
FIG. 2 schematically shows, in a perspective view, two separator plates of the system shown in FIG. 1, with a membrane electrode unit (membrane electrode assembly, MEA) arranged between the separator plates.

FIG. 2 shows, in a perspective view, two adjacent separator plates or bipolar plates 2 of an electrochemical system of the same type as the system 1 from FIG. 1, as well as a membrane electrode assembly (MEA) 10 which is arranged between said adjacent separator plates 2, the MEA 10 in FIG. 2 being largely obscured by the separator plate 2 facing towards the viewer. Embodiments of separator plate 2 are formed from two integrally joined individual plates 2a, 2b (see e.g., FIG. 3), of which only the first individual plate 2a facing the observer is visible in FIG. 2, which hides the second individual plate 2b. The individual plates 2a, 2b may be made of sheet metal, such as stainless steel sheet. The individual plates 2a, 2b may, e.g., be welded together, e.g., by laser welded connections.

The individual plates 2a, 2b have through-openings, which are aligned with one another and form through-openings 11a-c of the separator plate 2. The MEA 10 also has corresponding aligned through-openings, the specification of a separate reference sign being omitted here for reasons of clarity. When a plurality of MEAs 10 and separator plates of the same type as the separator plate 2 are stacked, the through-openings 11a-c together with the corresponding through-openings of the MEAs form lines which extend through the stack 2 in the stacking direction 7 (see FIG. 1). Typically, each of the lines formed by the through-openings 11a-c is fluidically connected to one of the ports 5 in the end plate 4 of the system 1. Coolant may, e.g., be introduced into the stack or removed from the stack via the ducts formed by the through-openings 11a. In contrast, the lines formed by the through-openings 11b, 11c may be configured to supply fuel and reaction gas to the electrochemical cells of the fuel cell stack of the system 1 and to discharge the reaction products from the stack.

In order to seal off the through-openings 11a-c with respect to the interior of the stack 2 and with respect to the surrounding environment, the first individual plate 2a may in each case have sealing arrangements in the form of sealing beads 12a-c, which are in each case arranged around the through-openings 11a-c and in each case completely surround the through-openings 11a-c. On the rear side of the separator plates 2, facing away from the viewer of FIG. 2, the second individual plate 2b may have corresponding sealing beads for sealing off the through-openings 11a-c.

In a region 18 located opposite the electrochemically active region of the MEA 10, the first individual plates 2a usually have, on the front side thereof facing towards the viewer of FIG. 2, a flow field 17 with structures for guiding a reaction medium along the front side of the individual plate 2a. In FIG. 2, these structures are defined by a plurality of webs and channels extending between the webs and delimited by the webs. On the front side of the separator plate 2, facing towards the viewer of FIG. 2, the first individual plate 2a usually additionally has a distribution or collection region 20 with distributing channels 29. The distribution or collection region 20 comprises structures which are configured to distribute over the flow field 17 a medium that is introduced into the distribution or collection region 20 from a first of the two through-openings 11b, and/or to collect or to pool a medium flowing towards the second of the through-openings 11b from the flow field 17. In FIG. 2, the distributing structures of the distribution or collection region 20 are likewise defined by webs and channels extending between the webs and delimited by the webs. At the transition between the distribution and collection region 20 and the flow field 17, a transition region 21 is located on each side of the flow field 17, each of said transition regions being oriented parallel to the y-direction 9 in FIG. 2. In the transition region 21, the media-guiding structures have for example a reduced height compared to the adjoining regions 17 and 20 (see FIG. 3).

In the exemplary embodiment shown, the first individual plates 2a each also have a further sealing arrangement in the form of a perimeter bead 12d, which extends around the flow field 17 located opposite the active region 18, and also around the distribution or collection region 20 and the through-openings 11b, 11c and seals these off with respect to the through-opening 11a, that is to say with respect to the coolant circuit, and with respect to the environment surrounding the system 1. The second individual plates 2b each comprise corresponding perimeter beads. The structures of the flow field 17, the distributing structures of the distribution or collection region 20 and the sealing beads 12a-d are each formed in one piece with the individual plates 2a and are integrally formed in the individual plates 2a, for example in an embossing or deep-drawing process or by means of hydroforming. The same applies to the corresponding structures of the second individual plates 2b.

The two through-openings 11b or the lines through the plate stack of the system 1 that are formed by the through-openings 11b are often each fluidically connected to one another via passages 13b in the sealing beads 12b, via the distributing structures of the distribution or collection region 20 and of the transition region 21 and via the flow field 17 of the first individual plates 2a facing towards the viewer of FIG. 2. Analogously, the two through-openings 11c or the lines through the plate stack of the system 1 that are formed by the through-openings 11c are each fluidically connected to one another via corresponding bead passages, via corresponding distributing structures, transition regions and via a corresponding flow field on an outer side of the second individual plates 2b facing away from the viewer of FIG. 2. In contrast, the through-openings 11a or the lines through the plate stack of the system 1 that are formed by the through-openings 11a are usually each fluidically connected to one another via a cavity 19 that is enclosed or surrounded by the individual plates 2a, 2b. This cavity 19 serves in each case to guide a coolant through the separator plate 2, such as for cooling the flow field 17 of the separator plate 2 and thus indirectly the electrochemically active region 18 of the MEA 10.

Figure 3:
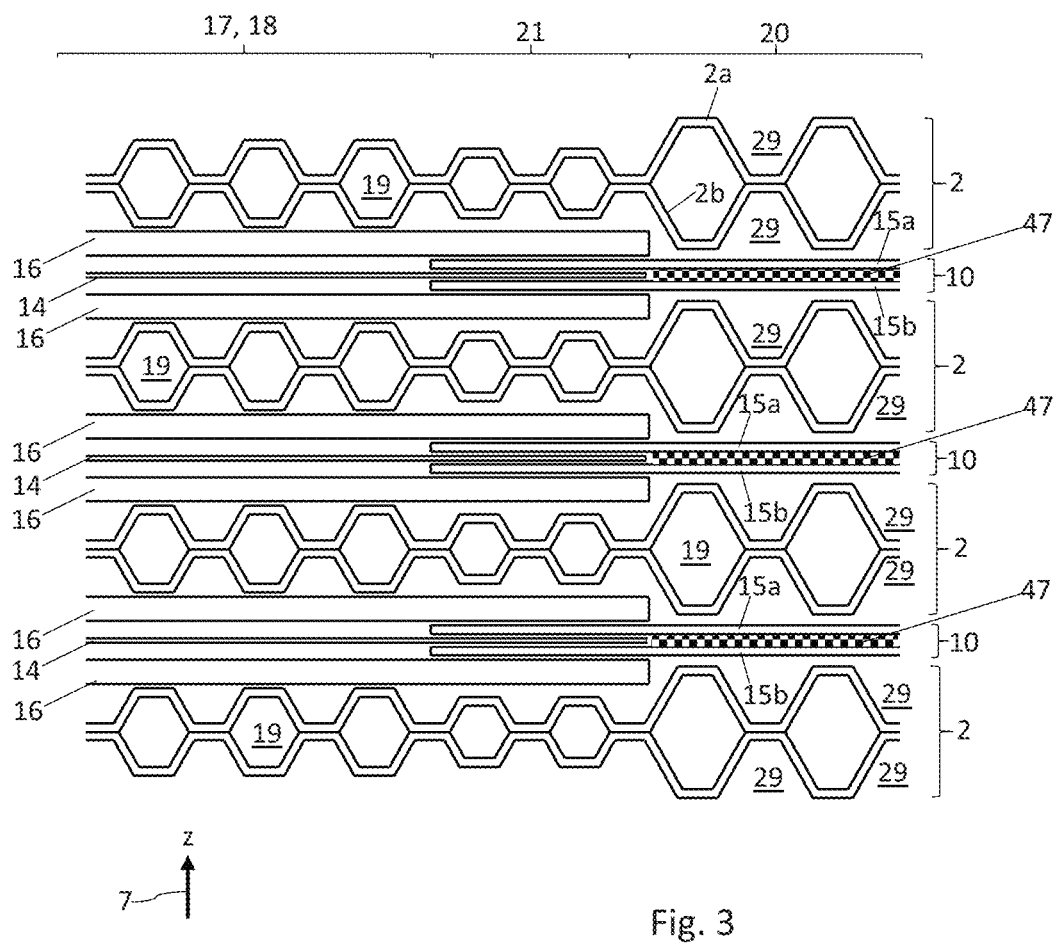
FIG. 3 schematically shows a section through part of the plate stack of the electrochemical system of FIG. 1.

FIG. 3 schematically shows a section A-A through part of the plate stack of the system 1 of FIG. 1, the sectional plane being oriented perpendicular to the plate planes of the separator plates 2. The structurally identical separator plates 2 of the stack each comprise the above-described first metal individual plate 2a and the above-described second metal individual plate 2b. Also shown are the flow field 17, which in terms of its extension corresponds to the electrochemically active region 18 of the MEA 10, the transition region 21 and the distribution or collection region 20 of the separator plates 2, each of the regions 17, 21, 20 having structures for guiding media along the outer faces of the separator plates 2, here for instance in the form of webs and channels bounded by the webs.

A membrane electrode assembly (MEA) 10 is arranged in each case between adjacent separator plates 2 of the stack. The MEAs 10 usually each comprise a membrane 14, for example an electrolyte membrane with catalyst layers, and a reinforcing layer connected thereto, here in each case two reinforcing layers 15a, 15b. The reinforcing layers 15a, 15b and the membrane 14 overlap in the transition region 21. By way of example, the at least one reinforcing layer 15a, 15b may in each case be connected on one side to the membrane 14 in a materially bonded manner, for example by an adhesive bond or by lamination. The at least one reinforcing layer 15a, 15b is usually formed of a film material, for example a thermoplastic film material or a thermosetting film material.

The region of the membrane 14 of the MEA 10 that is not covered by the reinforcing layers 15a, 15b extends in each case over the flow fields 17 of the adjoining separator plates 2, forms the active region 18 located opposite said flow fields 17 and there enables an electrochemical reaction on the membrane 14 or the catalyst layer present thereon. In addition, the membrane 14 extends at least partially into the transition region 21. The reinforcing layers 15a, 15b of the MEA 10 can in this case serve to position and fasten the MEA 10 between the adjoining separator plates 2. Separator plates 2 may have indentations or notches 52 and the MEAs 10 have indentations or notches 51 as a lateral positioning aid. The separator plates 2 and the MEAs 10 are in each case stacked one on top of the other in an alternating manner such that, with their positioning aids 52, 51, they laterally adjoin positioning means and are guided by the latter. However, since the MEA is very easily movable and bendable, there is a risk that the MEA will not be positioned correctly since it may for example expand or bulge in the edge region, i.e. may spread out in the stacking direction. The MEA 10 may thus deviate from the correct position relative to the bipolar plate. The present disclosure counters this in that the MEAs are not applied to the separator plates 2 only at the time of stacking the entire stack, but rather a composite structure (cf. assembly 50 below) consisting of the MEA 10 and the separator plate 2 is stacked. It is also conceivable that a composite structure consisting of a separator plate 2 with two MEAs 10 is stacked alternately with a separator plate without an MEA.

The reinforcing layers 15a, 15b each cover the distribution or collection region 20 of the adjoining separator plates 2 or extend into the distribution or collection region 20 of the adjoining separator plates 2. As shown in FIG. 3, the reinforcing layers 15a, 15b may additionally also cover the transition region 21 of the adjoining separator plates 2 or may extend into the transition region 21 of the adjoining separator plates 2. The edges of the reinforcing layers 15a, 15b bound the active region 18.

In the example of FIG. 3, the frame-like reinforcing layer 15 of the MEA 10 comprises in each case a first frame-like reinforcing layer 15a, also referred to as the first film layer 15a, and a second frame-like reinforcing layer 15b, also referred to as the second film layer 15b, each of the film layers 15a, 15b being connected to the membrane 14. In FIG. 3, the film layers 15a, 15b in the region 21 are arranged at least partially on both sides of the respective membrane 14 and border the latter along the stacking direction or along the z-direction 7. The film layers 15a, 15b are connected to the membrane 14 and to one another in the region 20 by means of an adhesive 47, which will often not be explicitly mentioned elsewhere in this document. Alternatively, the frame-like reinforcing layer 15 of the MEA may also be designed as a single-layer film material. The connection to embodiments of the MEA then takes place via an overlap region, but this is formed only on one side with respect to the MEA. The MEA 10 thus has in each case a greater thickness in the transition region 21 of the frame-like reinforcing layer 15 than in the region of the MEA 10 different than or bordered by the transition region 21, the thickness of the MEA 10 in each case being determined along the stacking direction or along the z-direction 7.

As shown in FIG. 3, gas diffusion layers 16 may additionally be arranged in the active region 18. The gas diffusion layers 16 enable the flowing onto the membrane 14 over a region of the surface of the membrane 14 that is as large as possible and can thus improve the media exchange over the membrane 14. The gas diffusion layers 16 may for example in each case be arranged on both sides of the membrane 14 in the active region 18 between the adjoining separator plates 2. The gas diffusion layers 16 may for example be formed of an electrically conductive fibre fleece or may comprise an electrically conductive fibre fleece. The gas diffusion layer(s) 16 and the membrane 14 are collectively referred to as the membrane composite. To accommodate both the frame-like reinforcing layer 15 of the MEA 10 and the gas diffusion layers 16 in the transition region 21, the media-guiding structures of the transition region 21 of the separator plates 2 may have a reduced height compared to the media-guiding structures of the adjoining regions 17 and 20, so as to prevent excessive compression of the separator plates 2, the MEAs 10 and the gas diffusion layers 16 in the transition region 21.

Differences between the present disclosure and conventional plate stacks occur in parts other than that shown in FIG. 3, and therefore the illustration in FIG. 3 shows a part of the conventional electrochemical cells of FIG. 2 but could be identical for assemblies according to the present disclosure.

Figure 4A:
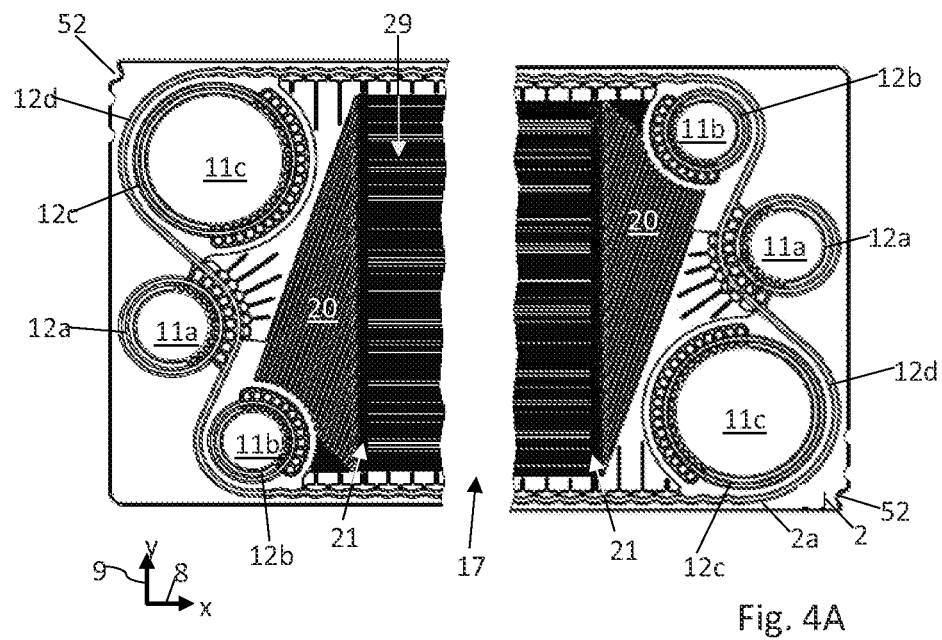
FIG. 4A shows two parts of the separator plate of FIG. 2, in a plan view.
Figure 4B:
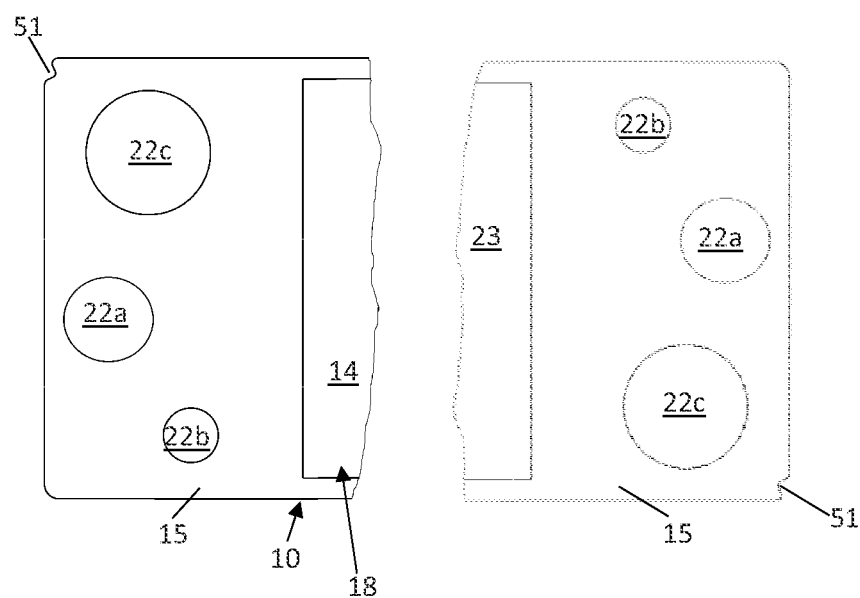
FIG. 4B shows two parts of the MEA adjoining the separator plate according to FIG. 4A.

FIG. 4A shows, in a plan view, two parts of the separator plate 2 of FIG. 2, such as of the first individual plate 2a of the separator plate 2 of FIG. 2. FIG. 4B likewise shows, in a plan view, corresponding parts of the MEA 10 adjoining the separator plate 2 shown in FIG. 4a, or of the frame-like reinforcing layer 15 thereof according to FIG. 2, the frame-like reinforcing layer 15 hereinafter also being referred to as the frame 15. Purely for the sake of clarity, only some of the elements of the separator plate 2 described above in relation to FIG. 2 are denoted by reference signs in FIG. 4A. In FIGS. 4A and 4B, the separator plate 2 and the frame 15 are deliberately shown substantially true to scale in relation to one another in order thus to illustrate which regions of the separator plate 2 and of the adjoining MEA 10 come into congruence with one another in a plate stack of the type shown in FIG. 1.

The frame-like reinforcing layer or the frame 15 of the MEA 10 comprises pairs of cutouts 22a-c as well as a central cutout 23. The area of the membrane 14 bordered by the frame-like reinforcing layer 15 is arranged in the region of the central cutout 23 of the frame-like reinforcing layer 15, said area coming into congruence with the flow field 17 of the adjoining separator plate 2 in the plate stack of the system 1 so that, in the active region 18, protons can pass through the membrane 14. The frame-like reinforcing layer 15 bounds the central cutout 23, which in turn thus also defines the electrochemically active region of the MEA 10. The cutouts 22a-c of the frame-like reinforcing layer 15 of the MEA 10 are dimensioned in such a way and the MEA 10 is or can be arranged relative to the adjacent separator plates 2 in such a way that the cutouts 22a-c align with the through-openings 11a-c of the adjoining separator plates 2 so that medium can pass through the cutouts 22a-c of the frame-like reinforcing layer 15. In FIGS. 4A, 4B, the frame-like reinforcing layer 15 of the MEA 10 is dimensioned in such a way and the MEA 10 is or can be arranged relative to the adjoining separator plates 2 in such a way that the frame-like reinforcing layer 15 entirely or at least partially covers the distribution or collection region 20 of the adjoining separator plates 2.

Figure 9:
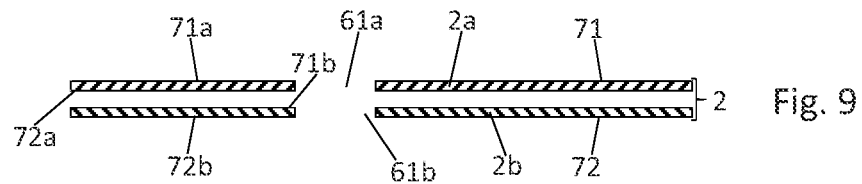
FIGS. 9-11 show steps of a method for producing an assembly according to one exemplary embodiment.

Reference is hereinafter made to FIG. 9 by way of example. In general, the separator plate 2 has a first flat side 71 and an opposite second flat side 72. The individual plates 2a, 2b can be referred to as the first layer 2a and second layer 2b of the separator plate 2. The first layer 2a has a first flat side 71a, which coincides with the first flat side 71 of the separator plate 2. In addition, the first layer 2a has a second flat side 72a, which adjoins a first flat side 71b of the second layer 2b. The second layer 2b comprises a second flat side 72b, which is coincides with the second flat side 72 of the separator plate 2.

Figure 5A:
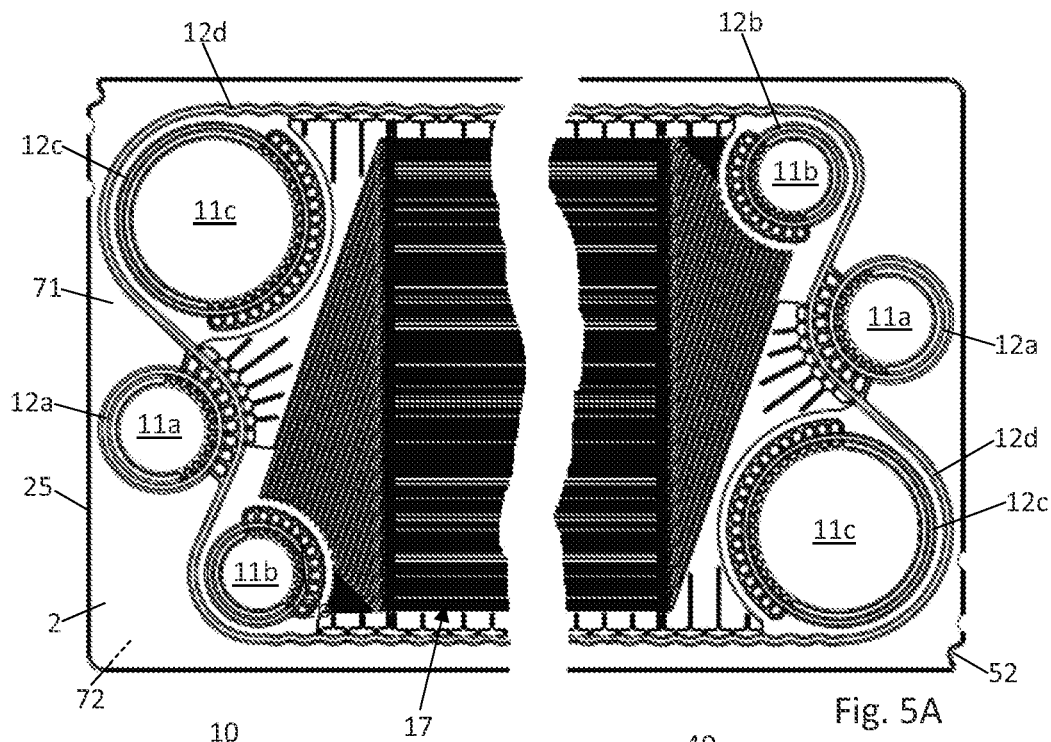
FIG. 5A shows two parts of a separator plate in a plan view according to one exemplary embodiment.
Figure 5B:
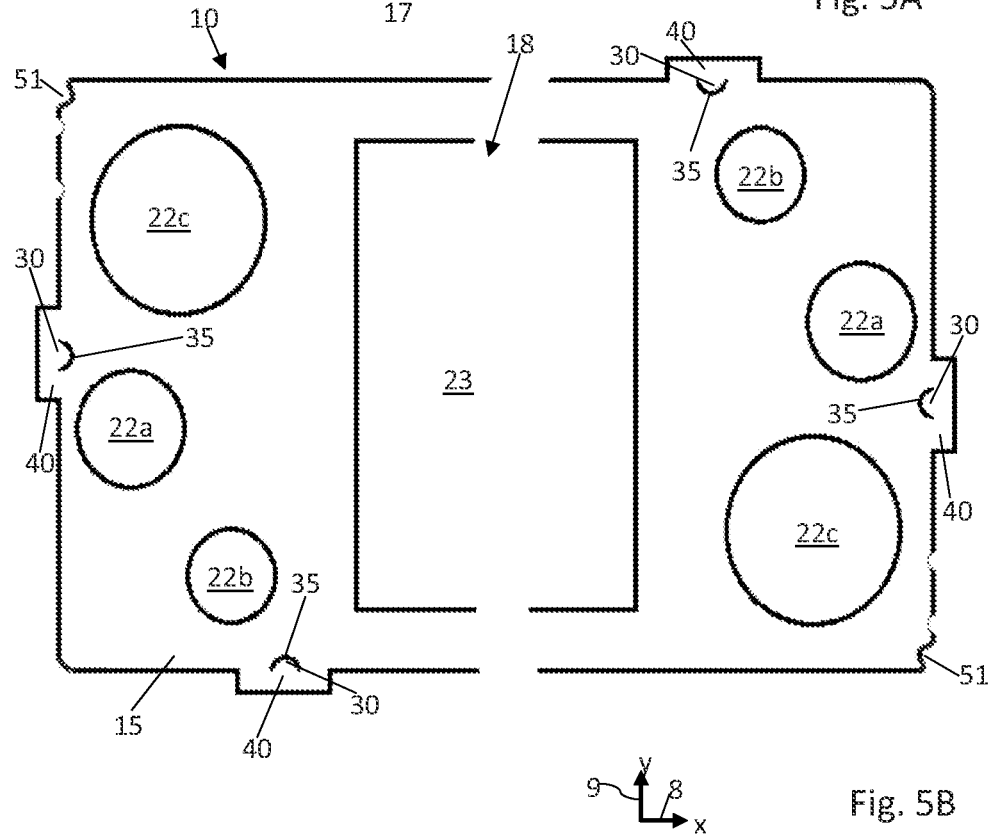
FIG. 5B schematically shows a plan view of the portion of the separator plate from FIG. 5A.

FIGS. 5A and 5B show a separator plate 2 and an associated MEA 10 which, when joined together, form an assembly 50 or a composite structure (cf. for example FIGS. 12-18, 20, 23A-E) for the electrochemical system 1. The separator plate 2 of FIG. 5A substantially corresponds to the separator plate 2 shown in FIG. 4A. In comparison to the MEA 10 of FIG. 4B, the MEA 10 of FIG. 5B has tabs 30 for positioning the MEA 10 relative to the separator plate 2 and/or for fastening the MEA 10 to the separator plate 2. In FIG. 5B, the MEA 10 comprises four tabs 30. However, fewer than four or more than four tabs 30 may also be provided.

The tab 30 is connected at one side to the frame-like reinforcing layer 15. The tab 30 also has a free end 35, which is fastened to the separator plate 2 in order to form the joined assembly 50. In the corresponding joined assembly 50, the frame-like reinforcing layer 15 is arranged on the first flat side 71 of the separator plate 2, while the free end 35 of the tab 30 is arranged on the second flat side 72 of the separator plate 2.

By way of the at least one tab 30, the MEA 10 can thus be connected to the separator plate 2 in a form-fitting and/or force-fitting manner. In some embodiments, there is therefore no need for a materially bonded connection, such as an adhesive bond, between the MEA 10 and the separator plate 2.

As shown in FIG. 5B, the frame-like reinforcing layer 15 may have, in the region of the tab 30, a protrusion 40 which protrudes laterally beyond an outer edge 25 of the separator plate 2. For fastening purposes or to form the assembly 50, the tab 30 is placed or pushed over the outer edge 25 of the separator plate 2.

Figure 6A:
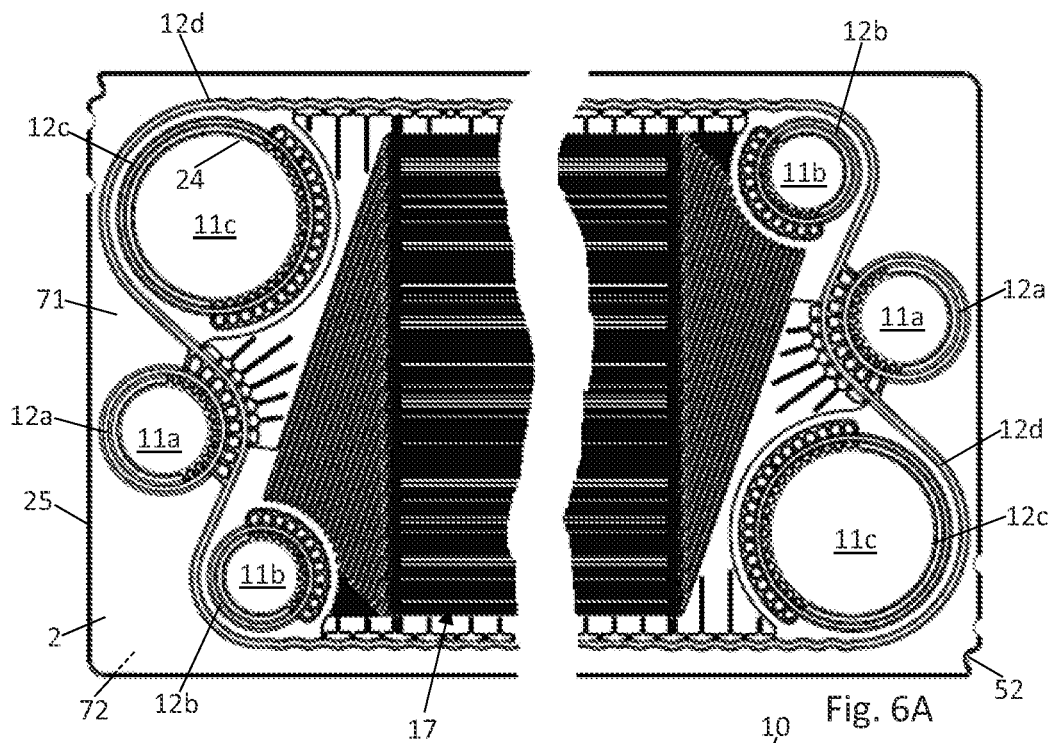
FIG. 6A shows two parts of a separator plate in a plan view according to one exemplary embodiment.
Figure 6B:
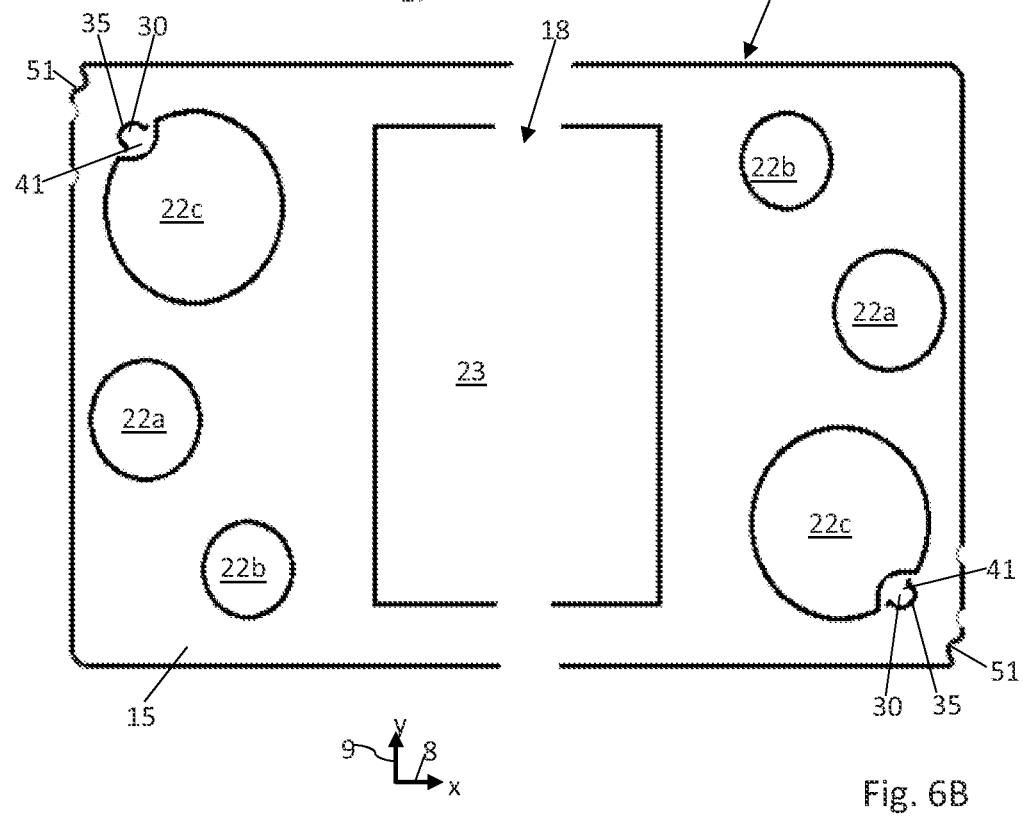
FIG. 6B shows two parts of an MEA compatible with the separator plate of FIG. 6A, in a plan view.

The MEA 10 of FIG. 6B differs from the MEA 10 of FIG. 5B in that the frame-like reinforcing layer 15 has, in the region of the tab 30, a protrusion 41 which protrudes laterally beyond an inner edge 24 of the separator plate 2. In the exemplary embodiment shown, the inner edge 24 is part of the through-opening 11c. As an alternative or in addition, the protrusion 41 may also protrude beyond an inner edge of the through-openings 11a or 11b. In the assembly 50, the tab 30 is inserted in the through-opening 11c so that the free end 35 of the tab 30 is arranged on the second flat side 72 of the separator plate 2. The separator plate 2 of FIG. 6A substantially corresponds to the separator plate 2 shown in FIGS. 5A and 4A.

Thus, in FIGS. 5B and 6B, the frame-like reinforcing layer 15 adjacent to the tab 30 protrudes beyond an inner or outer edge 24, 25 of the separator plate 2. In the embodiments of FIGS. 5A, 5B, 6A, 6B, the separator plate 2 need not be adapted to the MEA 10 with the tabs 30. Conventional separator plates 2 can therefore be used for the assemblies 50 of these embodiments, without having to be modified for this purpose.

The separator plates 2 shown in FIGS. 7A, 8A, 9-20, 21A-C, 21E have modifications compared to known separator plates 2, which modifications will be described below.

Figures 7A, 7B:
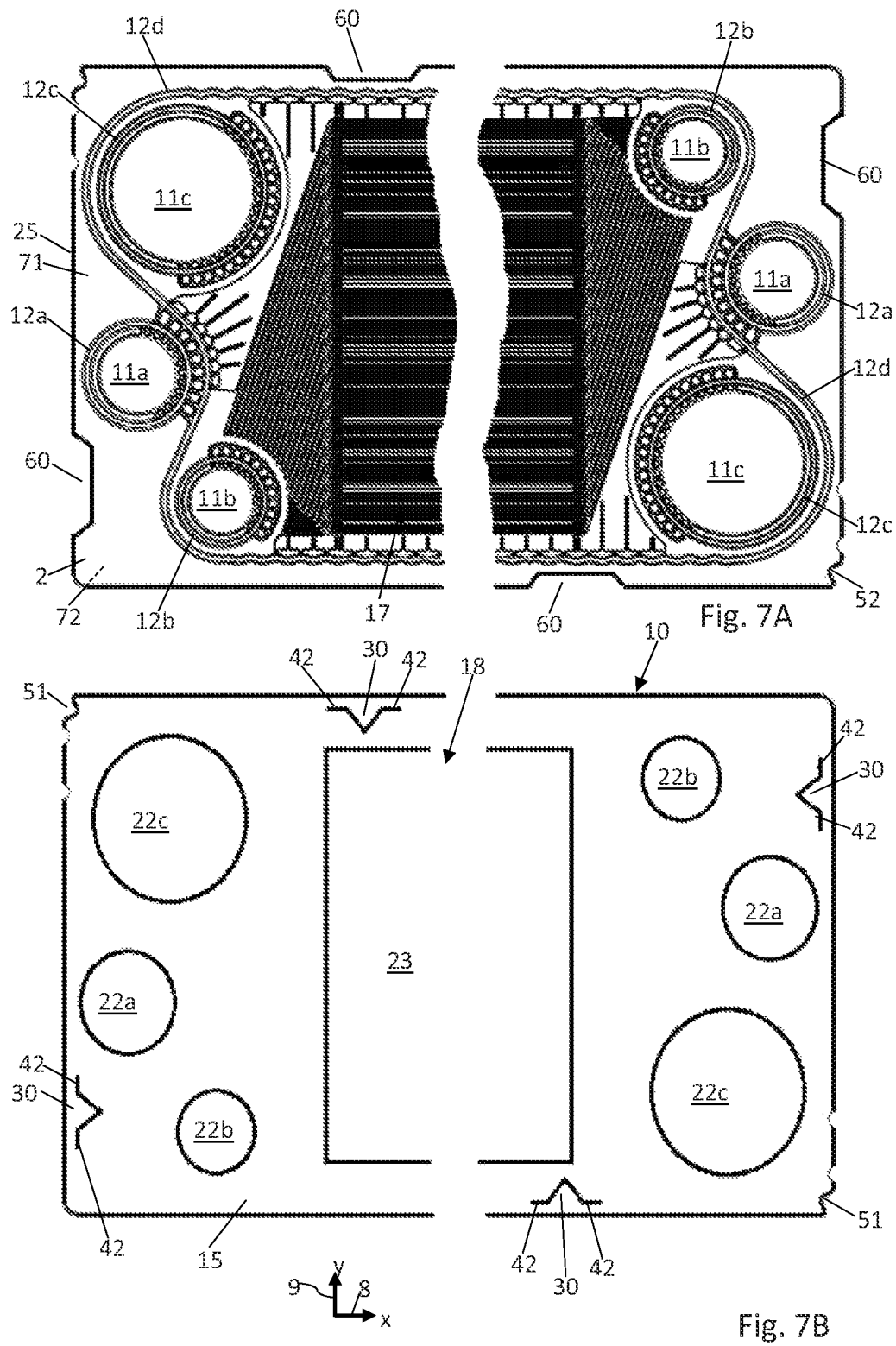
FIG. 7A shows two parts of a separator plate in a plan view according to one exemplary embodiment.
FIG. 7B shows two parts of an MEA compatible with the separator plate of FIG. 7A, in a plan view.

In the embodiment of FIG. 7A, a recess 60 is provided in the outer edge region of the separator plate 2. The MEA 10 of FIG. 7B has a plurality of tabs 30 which are arranged on different sides of the electrochemically active region or of the membrane 14. In order to form the assembly 50, the tabs 30 of the frame-like reinforcing layer 15 can be placed or pushed over the outer edge 25 of the separator plate in the region of the recess 60. Therefore, instead of the protrusion 40, 41 in the MEA 10 (see FIGS. 5B, 6B), a notch 60 may also be formed on the outer edge or inner edge of the separator plate 2 in order to make it possible to fasten the tab 30 to the separator plate 2.

It can also be seen in FIG. 7B that incisions 42 are provided in the frame-like reinforcing layer 15, which incisions extend at an angle, usually substantially perpendicularly, to an insertion or push-in direction of the tab 30. The incisions 42 adjoin the tab 30 at the point where the tab 30 is connected to the frame-like reinforcing layer 15. These incisions 42 may aid a mobility of the respective tab 30 or prevent tearing of the tab 30. Although the incisions 42 are described only in connection with FIG. 7B, they can be implemented in any frame-like reinforcing layer 15 as required.

Figure 8A:
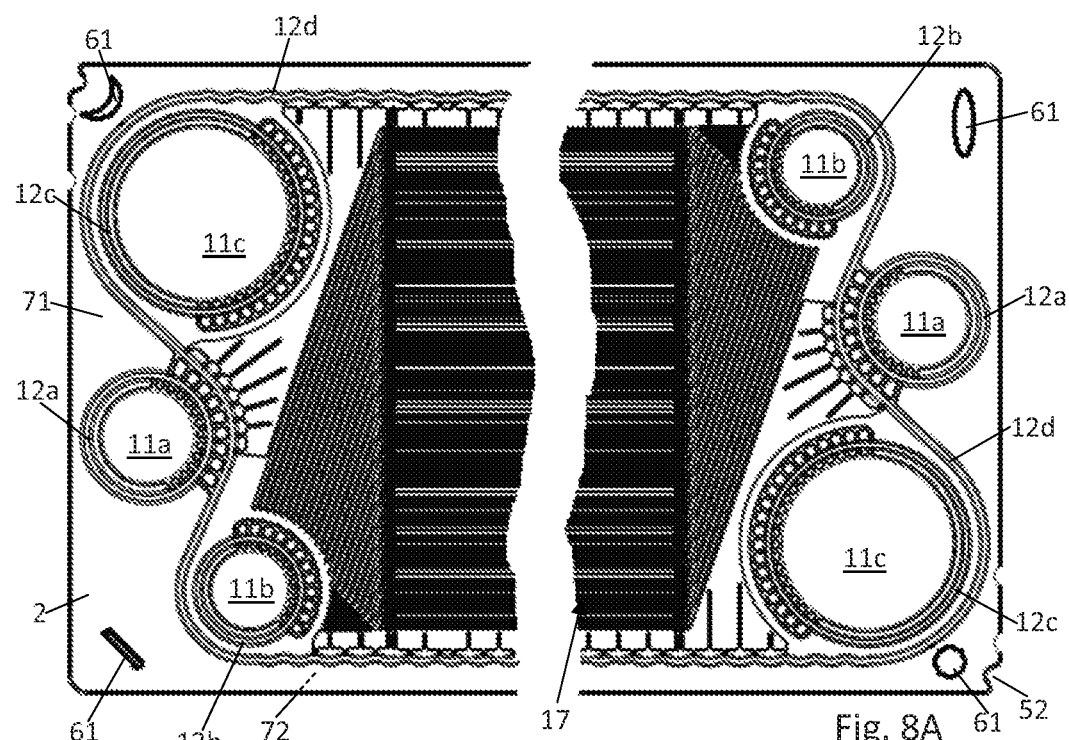
FIG. 8A shows two parts of a separator plate in a plan view according to one exemplary embodiment.
Figure 8B:
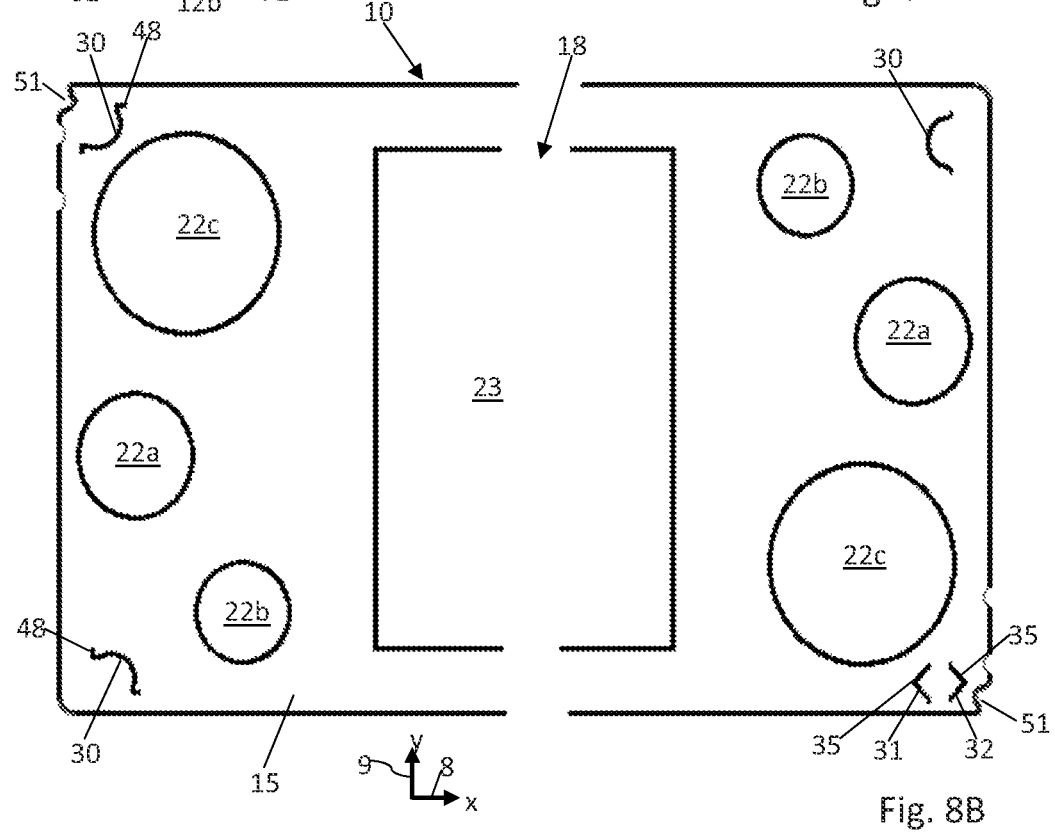
FIG. 8B shows two parts of an MEA compatible with the separator plate of FIG. 8A, in a plan view.

The MEA 10 shown in FIG. 8B likewise has a plurality of tabs 30, 31, 32, the tabs 30, 31, 32 having different shapes. In this case, only the tabs 30 have incisions 48 similar to the incisions 42 of the preceding embodiment, but here these are at a significantly larger angle. For receiving the tabs 30, 31, 32, through-openings 61 are formed in the outer edge region of the separator plate 2 of FIG. 8A. When joining together the separator plate 2 and the MEA 10, the tab 30 is inserted in the corresponding through-opening 61 in such a way that the tab 30 engages through the through-opening 61 and thus is arranged on the opposite flat side of the separator plate 2. To avoid any slipping of the MEA 10 with respect to the separator plate, the through-opening 61 may be designed in such a way that it bounds laterally, with a substantially precise fit, the tab 30 engaging therethrough. The respective through-opening 61 may receive one tab 30 or a plurality of tabs 31, 32. For instance, the MEA 10 comprises two tabs 31, 32, the free ends 35 of these tabs 31, 32 pointing away from one another and engaging through the same through-opening 61. Located between the tabs 31, 32 is a web-like strip of the reinforcing layer 15, to which each of the tabs 31, 32 is connected.

Figure 10:
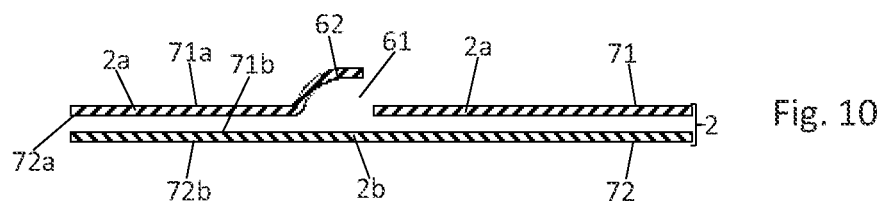
Figure 11:
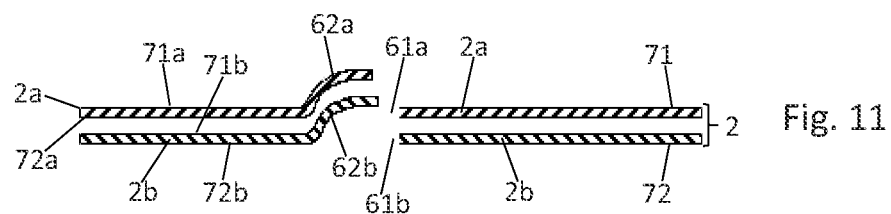

FIGS. 9-11 each show a section through a portion of a separator plate 2.

The separator plate 2 of FIG. 9 comprises two layers 2a, 2b, which have mutually aligned through-openings 61a, 61b, into which a tab 30 of an MEA 10 can be inserted. The separator plate 2 of FIG. 9 has no embossed structure in the region of the through-openings 61a, 61b.

FIG. 10 likewise shows a separator plate 2 on its own, that is to say without an MEA 10. The first layer 2a of the separator plate 2 comprises a through-opening 61 for receiving a tab 30, while the second layer 2b has no opening in the region of the through-opening 61 of the first layer 2a. In addition, the embossed structure 62 is provided only in the depicted embodiment of first layer 2a.

In the separator plate 2 of FIG. 11, both through-openings 61a, 61b and embossed structures 62a, 62b are provided in both layers 2a, 2b.

FIGS. 12-17 each schematically show a section through a portion of an assembly 50 comprising an MEA 10 and a separator plate 2. For the sake of clarity, the separator plate 2 and the MEA 10 are shown at a distance from one another here. In practice, however, they bear against one another.

The separator plate has the same design in FIGS. 12-15 and comprises two individual plates or layers 2a, 2b, wherein only the first layer 2a comprises a through-opening 61 for receiving a tab 30. Since only the first layer 2a has said through-opening 61, the free end of the tab 30 is arranged on the second flat side 72a of the first layer 2a. The reinforcing layer 15 is in this case arranged on the opposite first flat side 71a of the first layer 2a.

The first layer 2a may additionally comprise an embossed structure 62, which adjoins the through-opening 61. Typically, the embossed structure is provided in an outer edge region of the layer 2a or separator plate 2, outside of the region enclosed by the perimeter bead 12d. In the present exemplary embodiment, the reinforcing layer 15 does not bear against the embossed structure 62, but its edge partially covers the embossed structure 62. The embossed structure 62 forms a receptacle for the free end of the tab 30 and bounds the tab 30 laterally. In addition, the embossed structure may be designed to stiffen the region of the layer 2a around the tab 30. The embossed structure 62 may thus serve to stabilize the assembly 50, but can also act as a spacer for the tab 30. Since the embossed structure 62 is usually provided only for fastening the tab 30, no sealing function or flow-guiding function is associated with this type of embossed structure 62.

The assemblies 50 of FIGS. 12-15 differ in the type of MEA 10 used, while the separator plate 2 used is the same in each case.

Figure 12:
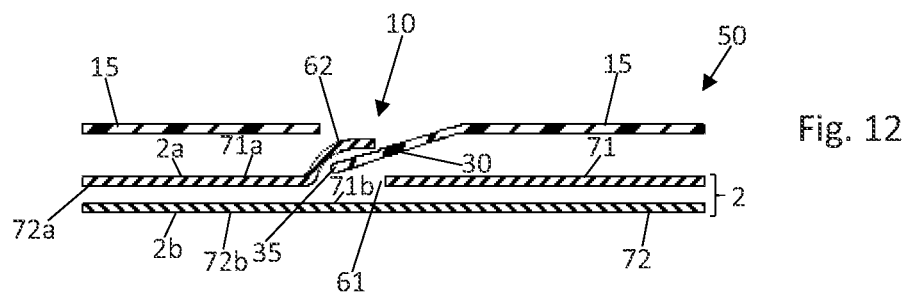
FIGS. 12-17 show steps of a method for producing an assembly according to one exemplary embodiment.

The reinforcing layer 15 of the MEA 10 of FIG. 12 is single-layered and comprises a single film layer, wherein the tab 30 is formed integrally with the reinforcing layer 15 and is inserted in the opening 61 of the layer 2a.

Figure 13:
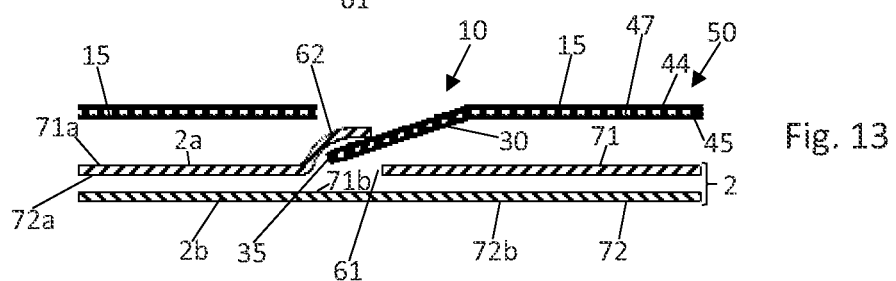

The reinforcing layer 15 of the MEA 10 of FIG. 13 is two-layered and comprises a first film layer 44 and a second film layer 45. The film layers 44, 45 are connected to one another in a materially bonded manner via an interposed adhesive layer 47. Alternatively, the film layers 44, 45 may for example be laminated to one another. The tab 30 is formed integrally with both film layers 44, 45 of the reinforcing layer 15 and is inserted in the opening 61 of the layer 2a.

Figure 14:
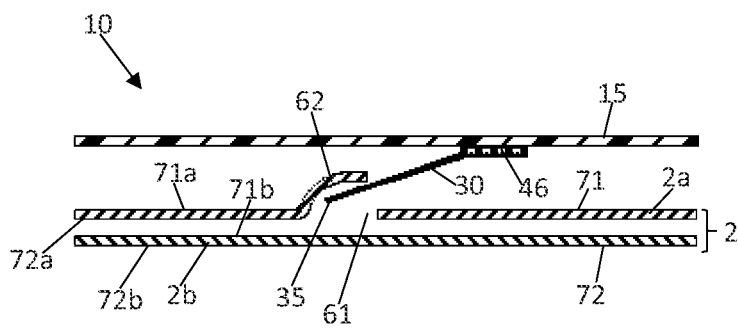

The reinforcing layer 15 of the MEA 10 of FIG. 14 is single-layered, the tab 30 and the reinforcing layer 15 being separate elements. The tab 30 and the reinforcing layer 15 are connected to one another at a connection point 46 in a materially bonded manner, for example by means of an adhesive bond or a welded joint. The free end 35 of the tab 30 is inserted in the opening 61 of the layer 2a. One advantage of this embodiment is that conventional MEAs 10 can be subsequently provided with the tab 30.

Figure 15:
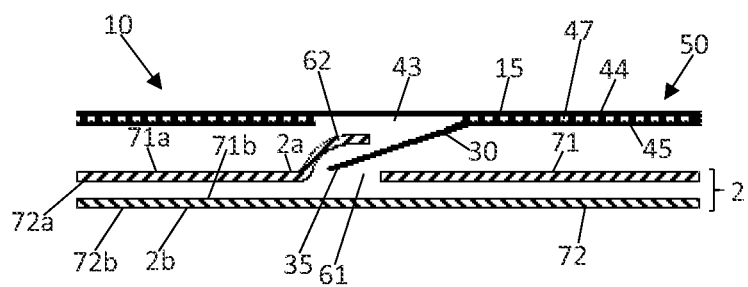

In the embodiment of FIG. 15, the reinforcing layer 15 of the MEA 10 is two-layered and comprises a first film layer 44 and a second film layer 45, which may correspond to the aforementioned film layers 15a, 15b. The film layers 44, 45 are connected to one another in a materially bonded manner via an interposed adhesive layer 47. Alternatively, the film layers 44, 45 may for example be laminated to one another. In a cut-out region 43, the second film layer 45 is not connected to the first film layer 44 and at that location forms the tab 30. The tab 30 is thus formed integrally with the second layer 45 of the reinforcing layer 15 and is inserted in the opening 61 of the layer 2a. Since the cutout 43 is covered by the first film layer 44, the reinforcing layer 15 has no opening in the region of the tab 30, as a result of which the likelihood of a short-circuit can be reduced.

Figure 16:
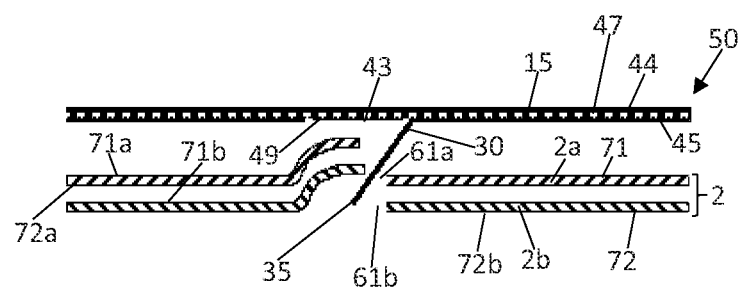

The embodiment of FIG. 16 has a number of modifications compared to that of FIG. 15. On the one hand, the tab 30 engages not only through the opening 61 of the layer 2a, but rather through the openings 61a, 61b of both layers 2a, 2b. It thus comes to lie on the second flat side 72b of the second layer 2b, but in this way is also arranged on the side of the second flat side 72a of the first layer 2a, while the frame-like reinforcing layer 15 is arranged on the first flat side 71a of the first layer 2a. Furthermore, in a manner differing from FIG. 15, the adhesive layer 47 in FIG. 16 is not removed in the region of the recess 43. Rather, in FIG. 16, the adhesive layer 47 in the region of the recess 43 is covered with a thin film 49, which prevents contact between the adhesive layer 47 and the first layer 2a of the separator plate 2 so that the separator plate 2 is not adhesively bonded to the MEA 10 and can be moved relative to the latter while positioning the separator plate 2 and the MEA 10.

In the MEAs of FIGS. 5B, 6B, 7B, 8B, 12, 13, the tab 30 is formed integrally with the frame-like reinforcing layer 15. To this end, the frame-like reinforcing layer 15 has incisions which delimit a border of the tab 30. To cover the cutout defined by the tab 30, the reinforcing layer 15 of the embodiments of FIGS. 5B, 6B, 7B, 8B, 12, 13 may have a further film layer, which covers the respective cutout. This further film layer may be provided only or at least in the region of the cutout or tab 30 or may extend over the entire area of the frame-like reinforcing layer 15.

In FIGS. 5B, 6B, 7B, 8B, the tabs 30 are arranged at different locations on the MEA 10. The tabs 30 may be arranged on opposite sides of the electrochemically active region 18 or of the membrane 14. The MEA 10, for instance the membrane 14, may be under slight tensile stress in the region between the tabs 30. The MEA 10 can thus be smoothed, which prevents the formation of wrinkles in the MEA 10.

The assemblies 50 shown in FIGS. 12-17 can be connected to one another or stacked to form the stack 6 of the electrochemical system 1. FIG. 18 shows, by way of example, a multi-layer system consisting of two assemblies 50a, 50b which are connected to one another, the structure of each assembly 50a, 50b being at least locally similar to the assembly 50 shown in FIG. 12. In FIG. 18, tabs 30 of single-layer MEAs 10 are in each case inserted in a layer of the separator plate 2 in order thus to form a pre-assembled unit consisting of two separator plates 2 and two MEAs 10. As stacking continues, the MEA 10 of the next pre-assembled unit will be pushed into the opening 61 having an adjoining embossed structure 62.

Figure 17:
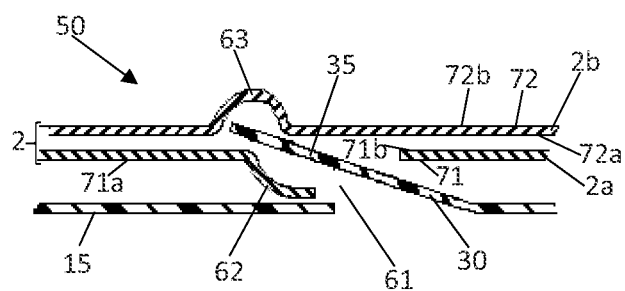
Figure 18:
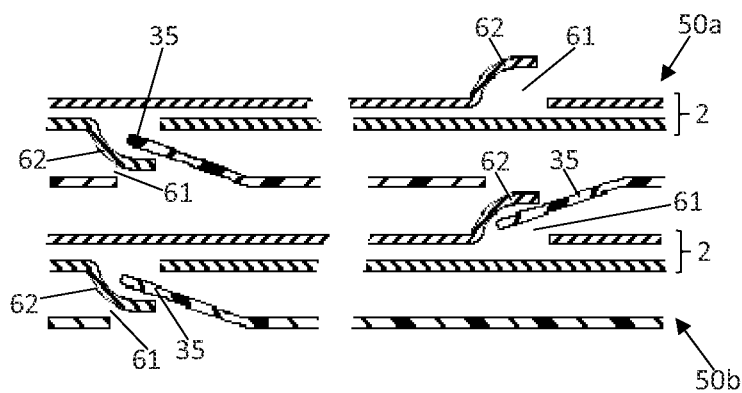
FIG. 18 schematically shows a section through a portion of an assembly comprising two MEAs and two separator plates according to one exemplary embodiment.

The assembly 50 of FIG. 17 substantially corresponds to the assembly of FIG. 12, the illustration in FIG. 17 being rotated through 180° in relation to FIG. 12. In addition, the second layer 2b of FIG. 17 comprises a second embossed structure 63, wherein the embossed structure 63 forms a receptacle for the free end 35 of the tab 30 and the free end 35 of the tab 30 is located in the receptacle formed by the second embossed structure 63. The embossed structures 62, 63 may be arranged diagonally opposite and offset from one another (see FIG. 17) so that the end 35 of the tab 30 pointing away from the reinforcing layer 15 can be received in the space between the embossed structures 62, 63. The embossed structures 62, 63 may additionally point in different directions (cf. FIG. 17) or in the same direction (cf. FIG. 11) with respect to a plate plane of the separator plate 2. In a further embodiment, the first embossed structure 62 of the first layer 2a is omitted, so that only the second layer 2b has a second embossed structure in the region of the tab 30.

The tabs 30, 31, 32, protrusions 40, 41, incisions 42, 48, recesses 60, openings 61 and/or embossed structures 62, 63, 64 described above and shown in the figures may supplement one another and be combined with one another in an assembly 50, a stack 6 and/or an electrochemical system 1.

Figure 19:
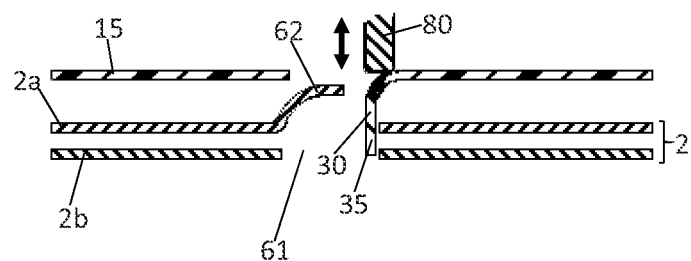
FIGS. 19-20 show steps of a method for producing an assembly according to one exemplary embodiment.
Figure 20:
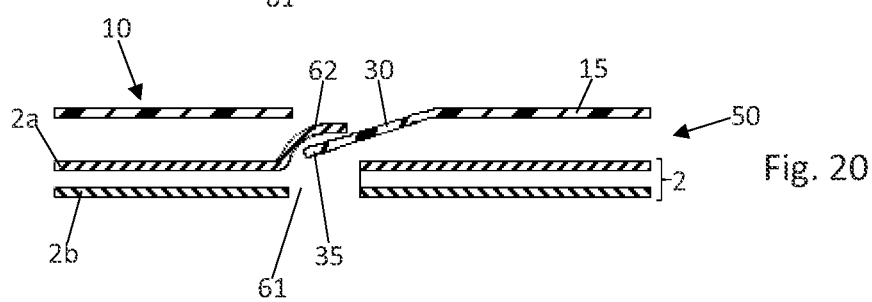

The way in which the assembly 50 can be produced will be explained with reference to FIGS. 19 and 20. First, an MEA 10, which has an above-described tab 30, and a separator plate 2 are provided. The MEA 10 is placed onto the separator plate 2 or moved towards the separator plate 2. The tab 30 is then inserted in the through-opening 61 of the separator plate 2 by means of a ram 80. Due to the embossed structure 62 acting as a recess, the free end 35 of the tab 30 latches into the receptacle defined by the embossed structure 62, thereby creating the assembly 50. Alternatively, the free end 35 of the tab 30 may also be pushed into the receptacle defined by the opening 61 and the embossed structure 62. The joining step by means of the ram 80 is therefore optional.

FIGS. 21A-E each schematically show a top view of a portion of an outer edge region of a separator plate 2. FIGS. 22A-E each schematically show a top view of a portion of a frame-like reinforcing layer 15 of an MEA 10. FIGS. 23A-E each schematically show a top view of an assembly 50 which comprises the separator plate 2 of FIGS. 21A-21E and the associated MEA 10 of FIGS. 22A-22E.

In the embodiment of FIG. 23A, it can be seen that the tab 30 is inserted through the through-opening 61 of the separator plate 2. The through-opening 61 bounds the tab 30 laterally with a substantially precise fit.

In the embodiment of FIG. 23B, it can be seen that the tab 30 is inserted through the through-opening 62 of the separator plate 2, the tab 30 being bounded laterally by two embossed structures 64 formed in the separator plate and being held in position by these.

The embodiment of FIG. 23C shows that two tabs 31, 32 engage in the same opening 61 of the separator plate 2. The free ends 35 of the tabs 31, 32 point away from one another and are arranged on the rear side of the layer 2a.

In the embodiment of FIG. 23D, the triangular tab 30 is arranged in the region of the protrusion 40 of the MEA 10, the protrusion 40 protruding beyond an outer edge 25 of the separator plate 2. No additional measures have been taken on the separator plate 2 in order to receive or position the tab 30.

In the embodiment of FIG. 23E, the separator plate 2 has two embossed structures 64, which define a receiving area for the tab 30 and laterally bound the free end 35 of the tab 30.

It should be noted that the embodiments of FIGS. 23A, 23B, 23C, 23D and/or 23E can be combined with one another.

In the preceding embodiments, the frame-like reinforcing layer 15 and the at least one tab 30, 31, 32 may be made of an electrically insulating material. In a manner differing from the two-layer separator plates 2 shown, the separator plate may also be single-layered. By way of example, the separator plate 2 is a single plate of a humidifier plate.

As can be seen from the accompanying figures, the tabs 30, 31, 32 may have different shapes. The tab 30, 31, 32 may for example be semi-circular, rectangular, trapezoidal, crescent-shaped, tongue-shaped, U-shaped or V-shaped.

The present disclosure also proposes a stack 6 of multiple assemblies 50 of the type described above. The assemblies 50 of the stack 6 may in this case be structurally identical; however, at least two different assemblies 50 may also be installed in the stack 6.

The present disclosure additionally provides an electrochemical system 1 which contains the stack 6 or at least one assembly 50 of the type described above. The electrochemical system 1 may be a fuel cell system, an electrochemical compressor, an electrolyzer, or a redox flow battery. The separator plates 2 or assemblies 50 can also be used in a humidifier for an electrochemical system, the electrochemically active region in such cases being replaced by a region permeable to water vapor.

Finally, it should be noted that the features of the embodiments of FIGS. 5-23 may be claimed individually or combined with one another, insofar as they do not contradict one another.

FIGS. 1-23E show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An assembly for an electrochemical system, the assembly comprising:
   a separator plate with at least one layer, and
   a membrane electrode assembly (MEA) comprising:
      an electrochemically active region,
      a frame-like reinforcing layer surrounding the electrochemically active region, and
      at least one tab for positioning the MEA relative to the separator plate and/or for fastening the MEA to the separator plate,
   wherein the at least one layer of the separator plate has a first flat side and a second flat side opposite the first flat side,
   wherein the tab is connected at one side to the frame-like reinforcing layer and a free end of the tab is arranged on the side of the second flat side of the at least one layer of the separator plate,
   wherein the frame-like reinforcing layer is arranged on the first flat side of the at least one layer of the separator plate,
   wherein the tab is formed integrally with the frame-like reinforcing layer, and
   wherein at least one incision or recess is provided in the frame-like reinforcing layer, and the incision or recess delimits a border of the tab.

2. The assembly according to claim 1, wherein, adjacent to the tab, the frame-like reinforcing layer protrudes beyond an inner or an outer edge of the separator plate.

3. The assembly according to claim 1, wherein the at least one layer of the separator plate has a through-opening, through which the tab engages.

4. The assembly according to claim 3, wherein the through-opening is designed in such a way that it laterally bounds the tab engaging therethrough.

5. The assembly according to claim 3, further comprising two tabs, wherein the free ends of the tabs point away from one another, the tabs engaging through the same through-opening of the at least one layer of the separator plate.

6. The assembly according to claim 1, wherein the at least one layer of the separator plate has at least one embossed structure and the tab bears against the embossed structure.

7. The assembly according to claim 6, wherein the embossed structure adjoins a through-opening.

8. The assembly according to claim 1, wherein the separator plate has, at least in part, one single layer or exactly two layers.

9. The assembly according to claim 8, wherein the exactly two layers each have a first flat side and a second flat side, the second flat side of the first layer adjoining the first flat side of the second layer, the free end of the tab being arranged on the second flat side of the first layer or on the second flat side of the second layer, and the frame-like reinforcing layer being arranged on the first flat side of the first layer.

10. The assembly according claim 1, wherein the tab and the frame-like reinforcing layer are formed of an electrically insulating material.

11. The assembly according to claim 1, wherein the tab is semi-circular, rectangular, trapezoidal, crescent-shaped, tongue-shaped, U-shaped or V-shaped.

12. The assembly according to claim 1, further comprising at least two tabs which are designed in such a way that the MEA is under tensile stress in a region between the tabs, and the tabs are arranged on opposite sides of the electrochemically active region.

13. A stack, comprising a plurality of the assemblies according to claim 1.

14. The electrochemical system, further comprising at least one of the assemblies according to claim 1.

15. An assembly for an electrochemical system, the assembly comprising:
   a separator plate with at least one layer, and
   a membrane electrode assembly (MEA) comprising:
      an electrochemically active region,
      a frame-like reinforcing layer surrounding the electrochemically active region, and
      at least one tab for positioning the MEA relative to the separator plate and/or for fastening the MEA to the separator plate,
   wherein the at least one layer of the separator plate having has a first flat side and a second flat side opposite the first flat side,
   wherein the tab is connected at one side to the frame-like reinforcing layer and a free end of the tab is arranged on the side of the second flat side of the at least one layer of the separator plate,
   wherein the frame-like reinforcing layer is arranged on the first flat side of the at least one layer of the separator plate,
   wherein the tab is formed integrally with the frame-like reinforcing layer,
   wherein the frame-like reinforcing layer comprises two film layers, and the tab is formed by at least one of the two film layers, and
   wherein the tab defines a cutout in one of the two film layers of the frame-like reinforcing layer, the cutout being covered by a further film layer of the frame-like reinforcing layer.

16. An assembly for an electrochemical system, the assembly comprising:
   a separator plate with at least one layer, and
   a membrane electrode assembly (MEA) comprising:
      an electrochemically active region,
      a frame-like reinforcing layer surrounding the electrochemically active region, and
      at least one tab for positioning the MEA relative to the separator plate and/or for fastening the MEA to the separator plate, wherein the tab has a constant thickness,
   wherein the at least one layer of the separator plate has a first flat side and a second flat side opposite the first flat side,
   wherein the tab is formed integrally with and connected at one side to the frame- like reinforcing layer and a free end of the tab is arranged on the side of the second flat side of the at least one layer of the separator plate, and at least one incision or recess of the frame-like reinforcing layer delimits a border of the tab, and wherein the frame-like reinforcing layer is arranged on the first flat side of the at least one layer of the separator plate.

17. The assembly of claim 16, wherein the tab is spaced away from an outer perimeter of the frame-like reinforcing layer.

\* \* \* \* \*